9569X

B. H. Pearson,

Cook Stove.

Patented Mar: 31. 1830.

9569X

Mar 31, 1836

Benjamin H. Pearson of Warren New Hampshire

Letters Patent.

The schedule referred to in these Letters Patent and making part of the same containing a description in the words of the said Benjamin H. Pearson himself of his improvement "in the Cooking Stove"

Figure 2:
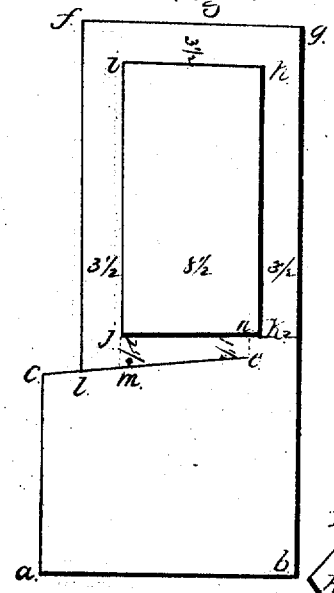
Figure 1:
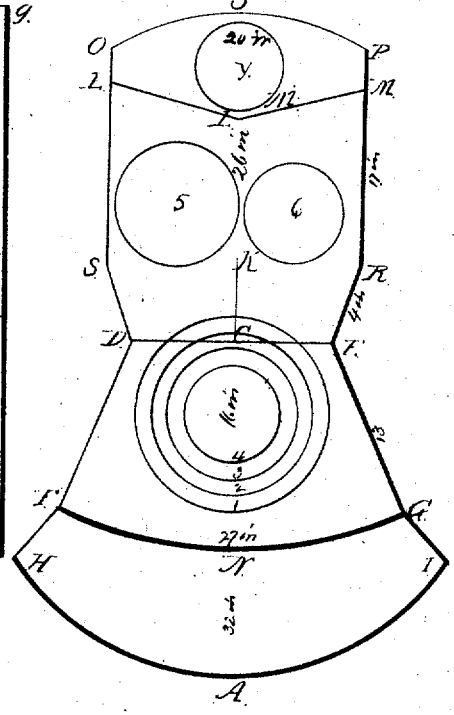
Figure 3:
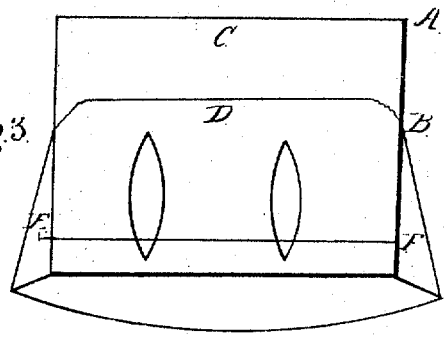

To all whom it may concern,

Be it known that I Benjamin H. Pearson of Warren in the County of Merrimack and State of New Hampshire, have invented an improvement in the Stove intended principally for cooking which I denominate, the open frame Cooking Stove, and that the following is a full and exact description thereof, Fig 1. represents the top part; the distance from D to B. is 16 inches - from N. to C. 16 inches, from F to G 27 inches, being the part over the fire place, The distance from C. to B, is 26 inches from O to P 20 inches - from P to R 17 inches & from R to E, 6 inches being the part over the back part of the stove, and the oven, K C is a damper which may be turned either to R or S, to carry the fire under Nos 5 and 6.- Numbers 1.2.3.4.5.6. are circles of different sizes to be used for Kitchen furniture. The distance from A to C is 32 inches from G to I. 6 inches from H to I. 38 inches, this represents the hearth M N and L L are dampers to throw the fire under the oven, as will be seen in Fig II. which represents the side view of the stove,- a.b.e.c. represents the part next the fire. The distance from a to b, 20 inches, from b to c, 13 inches from a to c, 12 inches from c to l 3 inches from f to g 17 inches the height of the back part of the stove i, j, k, h, represent the oven situated in the back part of the stove, the distance from i, to h, is 11 inches and it is 18 inches square on the top and the bottom with the exception of the fore corners being a little elipted. The distance from e to e is 16 inches, being the back part of the fire place, The oven is situated one inch higher than the back part of the fire place and from e to n is one inch and a half, and the fore part of the oven extends one inch above to k. The distance from l to m is 2 and a half inches. The distance from the bottom of the stove to the bottom of the oven is 3 inches and the same distance at 9569x Mar 31, 1836

14.

at the top of the oven to the top of the stove and the same space at the end.
The top of the oven extends the whole width of the Stove, the bottom and the
side opposite the door leaves a space of 2 inches for the fire to pass so that the fire
passes all over the Oven except on the side of the door, Fig. III, Represents the
front part of the stove. The distance from A to B is 8 inches — from C to D 6 inches
from E to F represents a crank on which are placed two half oval wheels
for the purpose of raising the grate in the fire place fastened at F with a cog wheel
No 7 in Fig 1. represents the flue, all the parts connected with the fire place,
the top and circles are to be of cast iron. the residue of the stove with the oven
is to be of sheet iron, This stove may be altered in its form and in its particular
arrangement of its parts whilst those features which constitute the difference
between it and other stoves for cooking and heating apartments are still
retained, It is therefore alone which I claim as my invention, and for
which I ask a patent. They consist in heating the oven on five parts — its par-
ticular situation to give a draft under the oven with an open fire place.
The damper K. C to turn the fire under No 5 & 6 and the turning
of crank with the two half oval wheels to rise or lower the grate in the fire place,
whether the same be effected in the exact way which I have indicated or in
any other operating upon the same principle and producing similar results.

Witnesses,
Daniel Pattee
S. C. Badger

Benjamin H. Pearson 882 n.b.

Entd.
Ckd W.

[illegible]